(12) United States Patent
Hodges et al.

(10) Patent No.: US 8,182,765 B2
(45) Date of Patent: May 22, 2012

(54) FLUID TRANSFER MECHANISM

(75) Inventors: Alastair Mcindoe Hodges, Rowville (AU); Ronald Christopher Chatelier, Victoria (AU); Garry Chambers, Rowville (AU)

(73) Assignee: Universal Biosensors Pty Ltd, Rowville (AU)

( * ) Notice: Subject to any disclaimer, the term of this patent is extended or adjusted under 35 U.S.C. 154(b) by 0 days.

(21) Appl. No.: 12/280,317

(22) PCT Filed: Feb. 15, 2007

(86) PCT No.: PCT/IB2007/000370
§ 371 (c)(1),
(2), (4) Date: Jan. 7, 2009

(87) PCT Pub. No.: WO2007/096730
PCT Pub. Date: Aug. 30, 2007

(65) Prior Publication Data
US 2009/0305431 A1   Dec. 10, 2009

Related U.S. Application Data

(60) Provisional application No. 60/774,678, filed on Feb. 21, 2006.

(51) Int. Cl.
*B01L 3/00* (2006.01)
*F04B 19/00* (2006.01)

(52) U.S. Cl. ....... 422/502; 422/68.1; 422/100; 422/102; 422/503; 422/504; 422/507; 436/180

(58) Field of Classification Search ................ 422/68.1, 422/100, 102, 502, 503, 504, 507; 436/180
See application file for complete search history.

(56) References Cited

U.S. PATENT DOCUMENTS

| | | | |
|---|---|---|---|
| 6,379,513 B1 | 4/2002 | Chambers | |
| 6,536,477 B1 * | 3/2003 | O'Connor et al. | 137/833 |
| 6,571,651 B1 | 6/2003 | Hodges | |
| 6,946,067 B2 | 9/2005 | Hodges | |
| 2003/0198576 A1 * | 10/2003 | Coyne et al. | 422/100 |
| 2004/0091399 A1 | 5/2004 | Chung et al. | |
| 2004/0121450 A1 * | 6/2004 | Pugia et al. | 435/287.1 |

(Continued)

FOREIGN PATENT DOCUMENTS
EP   0 057 110 A2   8/1982

(Continued)

OTHER PUBLICATIONS

Form PCT/ISA/210 International Search Report for PCT/IB2007/000370.

(Continued)

*Primary Examiner* — Brian J Sines
(74) *Attorney, Agent, or Firm* — Davis Wright Tremaine LLP

(57) ABSTRACT

A microfluidic device for transferring liquid from a first chamber to a second chamber is provided. The device has a first chamber; a second chamber; and a barrier between the first chamber and the second chamber, the barrier having least one opening fluidly connecting the first chamber to the second chamber, the at least one opening being sized such that a retention force, such as surface tension, keeps the liquid in the first chamber. The fluid is transferred from the first chamber to the second chamber when an initiation input such as fluid pressure is introduced to the liquid that is sufficient to overcome the retention force. The device may be a sensor strip.

30 Claims, 5 Drawing Sheets

U.S. PATENT DOCUMENTS

| | | |
|---|---|---|
| 2004/0203137 A1 | 10/2004 | Hodges |
| 2004/0265172 A1 | 12/2004 | Pugia et al. |
| 2005/0047972 A1 | 3/2005 | Lauks et al. |
| 2006/0134713 A1 | 6/2006 | Rylatt |
| 2007/0205103 A1 | 9/2007 | Hodges |

FOREIGN PATENT DOCUMENTS

| | | |
|---|---|---|
| EP | 1 612 429 A2 | 1/2006 |
| WO | WO 99/58245 | 11/1999 |
| WO | WO 01/35088 A1 | 5/2001 |
| WO | WO 01/78893 A2 | 10/2001 |
| WO | WO 2005/093388 A1 | 10/2005 |

OTHER PUBLICATIONS

Form PCT/ISA/237 Written Opinion of the International Searching Authority.

Intellectual Property Office of New Zealand, Examination Report, in corresponding application No. 571322, mailed on Feb. 9, 2010, 2 pages.

Australian Patent Office, "Examiner's first report," in corresponding Australian Patent Application No. 2007219203, issued on Nov. 7, 2011, 2 pages.

Office Action mailed in related Mexican Patent Application MX/a/2008/010719, received on May 30, 2011, 1 page.

Office Action mailed in related European Patent Application No. 07 705 600.0, dated Jun. 14, 2011, 4 pages.

European Patent Office, "Supplementary European Search Report," in corresponding European Patent Application No. 07705600.0, issued on Oct. 14,2010, 6 pages.

Singapore Patent Office, "Search and Examination Report," in corresponding Singapore Patent Application No. 200805955-2, conducted by Austrian Patent Office, 13 pages.

* cited by examiner

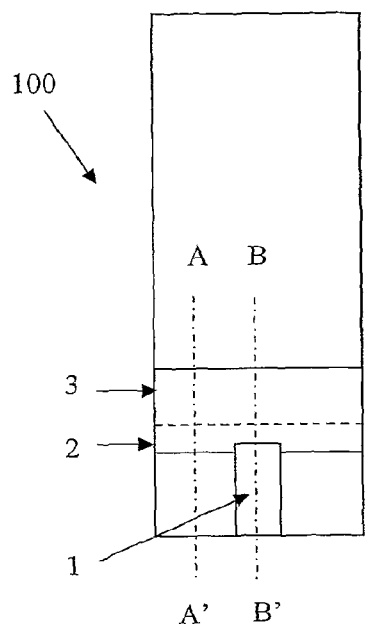
Figure 1
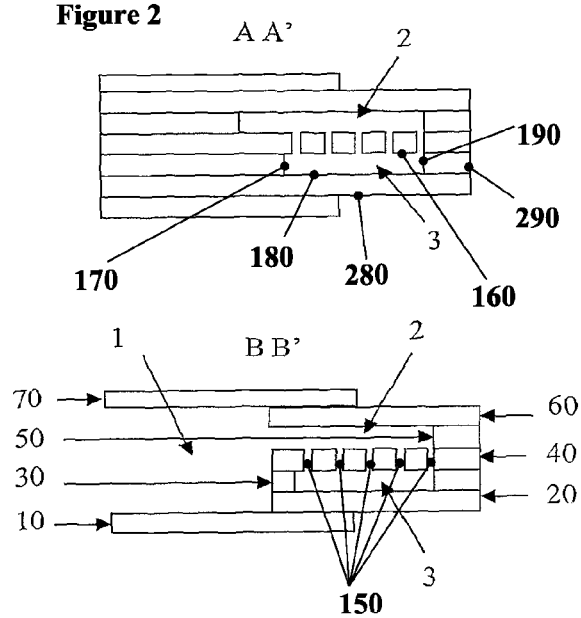
Figure 2
Figure 3

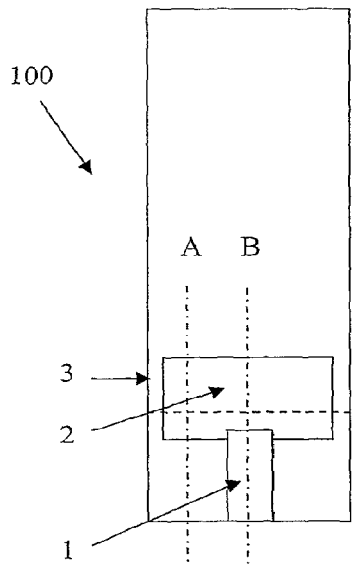
Figure 4
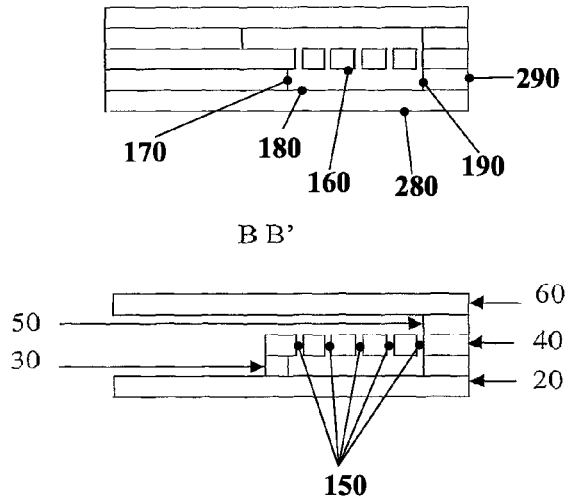
Figure 5
Figure 6
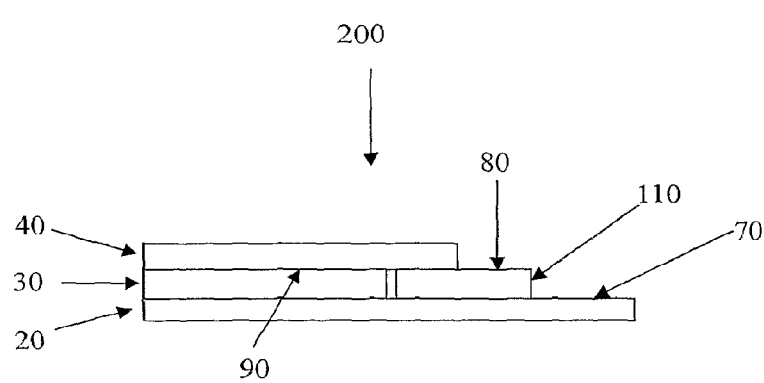
Figure 7

FLUID TRANSFER MECHANISM

BACKGROUND OF THE INVENTION

1. Field of the Invention

The present invention relates generally to fluid transfer mechanisms. Examples of particular embodiments of the invention relate to medical fluid testing mechanisms.

2. Related Art

The design of some sensor strips requires two or more chambers wherein fluid can be introduced into one chamber then transferred to a second chamber or additional chambers after a pre-determined time. In particular, immunoassay strips as disclosed in U.S. patent application Ser. Nos. 10/830,841 and 11/284,097 had at least two chambers, a first reaction chamber and a second detection chamber. In use, the liquid was first introduced into the reaction chamber and held there for a predetermined time while immuno-binding reactions proceeded, then transferred to the detection chamber. This timed transfer was achieved by having the detection chamber opening to the reaction chamber but unvented initially, such that when the reaction chamber filled, the opening to the detection chamber was closed off by the liquid. This trapped air in the detection chamber prevented it from filling with liquid. When it was desired to fill the detection chamber, a vent was opened at the end of the detection chamber remote from the reaction chamber, usually by puncturing a layer, whereupon liquid transferred from the reaction chamber to the detection chamber either partially emptying the reaction chamber or drawing sample from a filling reservoir.

The method given above has a number of potential disadvantages. It can be difficult to close the entrance to the detection chamber in a reliable manner across the range of viscosities of samples encountered when testing whole blood. This means that differing amounts of liquid can enter the detection chamber during filling of the reaction chamber, which can add to the variability of the response. Also, the reliability of a puncturing method can be difficult to guarantee over the life of a meter, with the potential for a needle or blade to become blunt with repeated use. It would therefore be desirable to develop a method for affecting a timed liquid transfer that overcomes these difficulties.

BRIEF SUMMARY OF THE INVENTION

An example of an embodiment of the invention seeks to provide a reliable and robust method for transferring small volumes of liquid between chambers utilizing passive transfer forces. The method involves providing a porous wall between the chambers between which the liquid is to be transferred. The porous wall has pores that are large enough to be substantially filled with the liquid to be transferred, but small enough such that the surface tension of the liquid interface with the second chamber prevents the liquid leaking out of the pores into the second chamber until an initiation step is performed.

Liquid is introduced into a first chamber such that it wets the porous wall and at least partially fills the pores. The liquid does not, however, enter the second chamber at this point as surface tension prevents it from exiting the opposite face of the porous wall into the second chamber. When it is desired to transfer liquid to the second chamber, an initiation step is performed which overcomes or breaks the surface tension and allows liquid to flow out of the pores and into the second chamber.

The initiation step is such that it overcomes the surface tension holding the liquid in the pores in the wall and allows the liquid to enter the second chamber. This initiation step can be provided by supplying a pressure pulse to the liquid in the first chamber, creating a vacuum in the second chamber, vibrating the strip, touching a surface to the surface of the porous wall facing the second chamber, or any other method that breaks or overcomes the surface tension.

Multiple second chambers can be filled from a single first chamber at the same or at different times by inducing the initiation mechanism in the desired second chamber(s) at the desired time(s). In addition, a third chamber could be filled from the second chamber by having at least a portion of a wall of the second chamber porous and in common with the third chamber, with the initiation step being performed on the third chamber when the transfer is required. This can of course be repeated for a subsequent string of chambers in parallel or series.

Particular embodiments of the invention provide a fluid transfer device for transferring liquid from a first chamber to a second chamber. The device has a first chamber; a second chamber; and a barrier between the first chamber and the second chamber, the barrier having at least one opening fluidly connecting the first chamber to the second chamber, the at least one opening being sized such that a retention force keeps the liquid in the first chamber. The fluid is transferred from the first chamber to the second chamber when an initiation input is introduced to the liquid that is sufficient to overcome the retention force.

Other embodiments of the invention provide methods of transferring liquid from a first chamber to a second chamber. The methods include providing a first chamber; providing a second chamber; providing a barrier between the first chamber and the second chamber, the barrier having at least one opening fluidly connecting the first chamber to the second chamber, the at least one opening being sized such that a retention force keeps the liquid in the first chamber; and transferring the liquid from the first chamber to the second chamber. The transferring takes place when an initiation input is introduced to the liquid that is sufficient to over come the retention force.

BRIEF DESCRIPTION OF THE DRAWINGS

The foregoing and other features and advantages of the invention will be apparent from the following, more particular description of particular embodiments of the invention, as illustrated in the accompanying drawings wherein like reference numbers generally indicate identical, functionally similar, and/or structurally similar elements.

FIG. 1 shows an example of a first embodiment of the invention;

FIG. 2 is a sectional view along section line A-A' of the embodiment shown in FIG. 1;

FIG. 3 is a sectional view along section line B-B' of the embodiment shown in FIG. 1;

FIG. 4 shows an example of a second embodiment of the invention;

FIG. 5 is a sectional view along section line A-A' of the embodiment shown in FIG. 4;

FIG. 6 is a sectional view along section line B-B' of the embodiment shown in FIG. 4;

FIG. 7 shows an alternate embodiment of the invention;

DETAILED DESCRIPTION OF THE INVENTION

Figure 8:
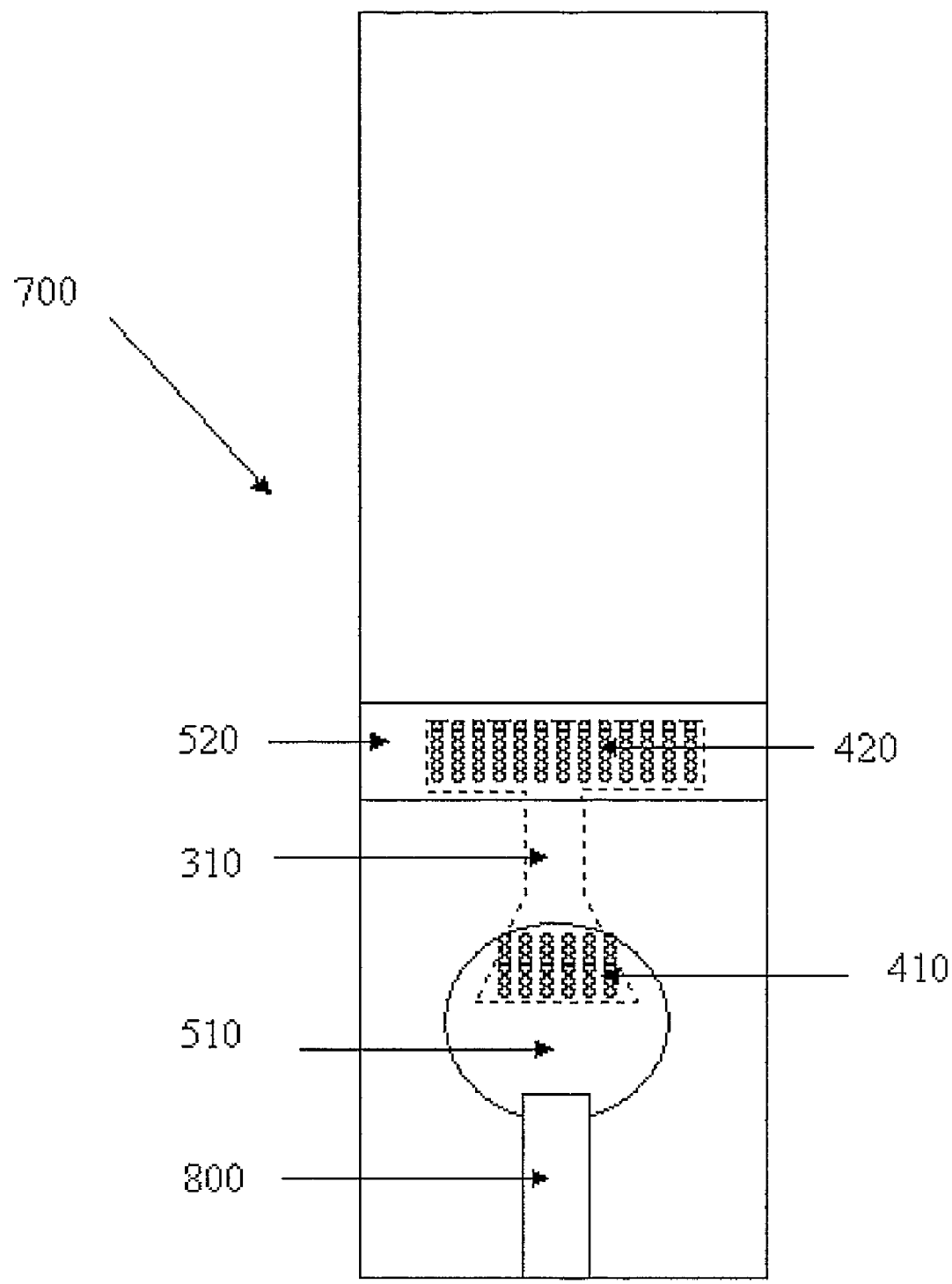
FIG. 8 shows an example of a third embodiment of the invention.

The invention will now be described with reference to a specific two chamber embodiment with a specific initiation step. This embodiment relates to a disposable immunoassay strip using electrochemical detection of the results of an immuno-binding reaction. Note that the terms upper and lower are used for convenience only in the following description, they do not imply anything about the preferred orientation of the device during use, which can in fact be used in any orientation.

The strip comprises three chambers, a filling chamber, a reaction chamber and a detection chamber. The filling chamber serves to receive the sample and act as a sample reservoir, the reaction chamber contains reagents whereby a probe is selectively immobilized in the reaction chamber to differing extents dependent upon the presence or concentration of an analyte in the sample. The detection chamber contains electrodes and reagents so as to be able to detect the amount of probe transferred with liquid from the reaction chamber and thus detect or quantify the amount of analyte in the original sample. An example of such a strip is shown in FIGS. 1-3. The strip 100 has a number of layers which are laminated together using adhesives. The strip has three chambers, a filling chamber 1, a reaction chamber (or first chamber) 2, and a detection chamber (or second chamber) 3. Layers 10 and 70 are sealing layers that serve to close the faces of chamber 1 to help to form a capillary space. Layer 20 is a layer carrying an electrically conductive upper surface 180 which serves as an electrode in detection chamber (or second chamber) 3. Layers 30 and 50 are spacer layers which have adhesive upper and lower faces. Layers 30 and 50 serve to hold the laminate together and to define the height of the detection (or second) and reaction (or first) chambers, respectively. A region cut-out of layer 30 shown in FIGS. 2 and 3 defines the area of detection chamber (or second chamber) 3 and the area of the detection chamber (or second chamber) electrodes. A region cut-out of layer 50 shown in FIGS. 2 and 3 defines the area of reaction chamber (or first chamber) 2. Layer 40 is a barrier layer containing pores 150 which serve as pores that connect reaction chamber (or first chamber) 2 to detection chamber (or second chamber) 3. Layer 40 has an electrically conductive coating on its lower surface 160 that serves as the second electrode in detection chamber (or second chamber) 3. Layer 60 serves to close reaction chamber (or first chamber) 2 and filling chamber 1. Optionally, layer 60 can carry an electrically conductive coating on its lower surface to serve as an electrode to detect when liquid fills reaction chamber (or first chamber) 2. With this option, liquid fills reaction chamber (or first chamber) 2 and the pores 150 in 40, thus bridging the electrode on the lower face 160 of 40 and that on the lower face of 60. This bridging can be detected to tell the meter to initiate the test sequence. Layers 10 and 70 can be secured to layers 20 and 60, respectively, by any suitable method. A preferred method is to use adhesive. In one embodiment, the adhesive can be applied to the lower surface 280 of layer 20 and the upper surface of layer 60, layers 10 and 70 can then be laminated to these adhesive layers. Alternatively, adhesive can be coated on to layers 10 and 70 and then those layers laminated to 20 and 60. The pores or openings or holes 150 define a fluid pathway from the reaction chamber (or first chamber) 2 to the detection chamber (or second chamber) 3. The detection chamber (or second chamber) 3 includes inner surfaces 170, 180 and 190 that are not co-planar with the barrier layer 40. The detection chamber (or second chamber) 3 includes outer surfaces 280 and 290.

FIGS. 4-6 show an alternative embodiment where the cut-out in layer 50 to form reaction chamber (or first chamber) 2 is such that the walls of the cut-out fully surround the cut-out to form an enclosed area. This embodiment has the advantage of preventing liquid from reaction chamber (or first chamber) 2 wetting around the open edge of reaction chamber (or first chamber) 2 to fill detection chamber (or second chamber) 3 from its open edge, rather than through the porous wall (barrier layer 40) connecting the two chambers. In this embodiment, the air that is displaced as liquid fills reaction chamber (or first chamber) 2 can vent through the holes 150 in the porous wall (barrier layer 40), allowing the reaction chamber (or first chamber) to fill until all the pores 150 in the wall (barrier layer 40) are filled with liquid or reaction chamber (or first chamber) 2 is fully filled. Note that it is not necessary for reaction chamber (or first chamber) 2 to be completely filled for correct operation, just that there is a sufficient volume of liquid in contact with the reagents in reaction chamber (or first chamber) 2 to fill detection chamber (or second chamber) 3. The pores or openings or holes 150 define a fluid pathway from the reaction chamber (or first chamber) 2 to the detection chamber (or second chamber) 3. The detection chamber (or second chamber) 3 includes inner surfaces 170, 180 and 190 that are not co-planar with the barrier layer 40. The detection chamber (or second chamber) 3 includes outer surfaces 280 and 290.

Also shown in FIGS. 4-6 is an embodiment where layers 10 and 70 are not required and instead layers 20 and 60 are extended to form the end walls of filling chamber 1. Optionally, in this embodiment the conductive layer on the upper surface 180 of 20 can be extended into filling chamber 1. If this is done, when liquid fills reaction chamber (or first chamber) 2 and the pores 150 of layer 40, electrical connection is made via the liquid between the conductive layer on 20 in filling chamber 1 and the conductive layer on the lower surface 160 of layer 40. This can be detected electrically as a drop in the resistance or a change in the voltage, or current flowing or capacitance between the conductive layers on 20 and 40. This can serve as a signal to the meter that liquid has filled detection chamber (or second chamber) 3 and thus automatically initiate a pre-determined test sequence. Note that an advantage of this method is that the signal won't be detected until the liquid in filling chamber 1 is of sufficient volume to touch the opening of reaction chamber (or first chamber) 2 and start to fill the pores 150 of layer 40. Similar to the method disclosed in U.S. Pat. No. 6,571,651, herein incorporated by reference, the capillary dimension of filling chamber 1 is greater than that of reaction chamber (or first chamber) 2, thus filling chamber 1 can empty to fill reaction chamber (or first chamber) 2. So if filling chamber 1 is sized so as to have a volume at least equal to and preferably slightly greater than reaction chamber (or first chamber) 2, then the signal indicating that liquid has been introduced into the device will not be detected until there is sufficient liquid introduced for the device to function as intended. An additional advantage of this is that if at first not enough liquid is introduced into filling chamber 1, more can be added until enough is present without affecting the intended operation of the device. When the fluid transfer is initiated between reaction chamber (or first chamber) 2 and detection chamber (or second chamber) 3, a second change in the electrical conditions between the conductive surfaces on 20 and 40 will occur, due to the wetting of the conductive layer on 20 in the area of detection chamber (or second chamber) 3. This change can be used to confirm to the meter that the fluid transfer has been successfully accomplished. Note that in general the current signal arising from the area of the conductive layer on 20 exposed in filling chamber 1 will be small compared to that generated by the area of the conductive layer exposed in detection chamber (or second chamber) 3, so it will not interfere significantly with the signal from detection chamber (or second chamber) 3. This is so as, in general, there are low concentrations of, or no significant amount of, electroactive species in the native sample that can generate current at the voltages normally applied between the electrodes in detection chamber (or second chamber) 3. Also, the relatively long liquid path between the conductive layer exposed in filling chamber 1 and the conductive layer on 40 gives a relatively high electrical resistance, which tends to reduce the current signal produced.

An advantage of this embodiment is that only two electrical connections are required to detect all the electrical signals from the strip to complete the test, one connection to the conductive layer on 20 and the second to the conductive layer on 40. Suitable connectors for this are disclosed in U.S. Pat. Nos. 6,379,513 and 6,946,067, and in U.S. patent application Ser. No. 11/284,136, which are incorporated by reference in this disclosure.

An alternative electrical connection method for this device is shown in FIG. 7. The connection device 200 is illustrated with reference to the present invention, however it is to be understood that this aspect of the invention is applicable to any device when it is desired that connection be made to surfaces that are in close proximity and face one another. The numbered elements in FIG. 7 with numbers common to the other figures denote the same element in the present illustration. In this embodiment of this aspect of the invention, FIG. 7 shows the end of the strip opposite to the end onto which filling chamber 1 opens. According to this embodiment, layer 20 is extended beyond spacer layer 30 and layer 40. Layer 20 carries an electrically conductive layer 70 on its upper surface and layer 40 carries an electrically conductive layer 90 on its lower surface. It is desired to make separate electrical connection to layers 70 and 90. Layer 40 is extended beyond spacer layer 30. An additional layer 110 is introduced into the space between layers 20 and 40 that extends beyond 30. Preferably the thickness of layer 110 plus a conductive layer 80 and any adhesive layers that may be present is to be equal to or slightly greater than the thickness of layer 30. Layer 110 is electrically conductive at least on its upper surface 80 however is not electrically conductive through its full thickness, such that electrical connection can be made between 80 and 90 but not between 90 and 70 via 110. Layer 110 and conductive layer 80 carried thereupon extend beyond the edge of 40, thus by bringing 80 and 90 into electrical connection, electrical connection can be made to 90 via 80 in the area of 80 that extends beyond 40. Preferably an adhesive layer is present between the lower surface of 110 and 70 to fix layer 110 in position. A conductive adhesive can optionally be placed between layers 90 and 80, in at least a portion of where they overlap, to help ensure good electrical connection. Alternatively the port containing the pins or similar devices to connect the strip to an external electrical circuit can be configured such that when the strip is inserted into the port, a face or faces of the port push against the upper surface of 40 to push 90 into connection with 80.

Figure 9:
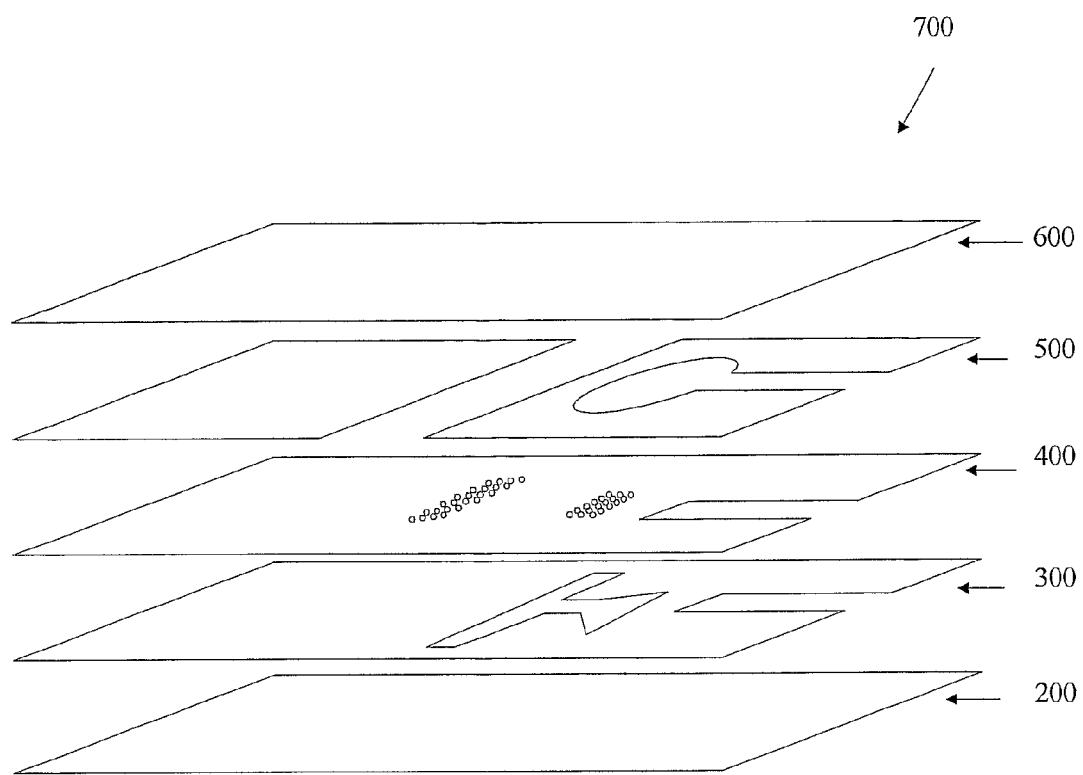
FIG. 9 is an exploded view of the embodiment shown in FIG. 8.

An embodiment of the invention using a device with three active chambers is shown in FIGS. 8 and 9. FIG. 8 shows a top view of a device with three active chambers and a filling chamber. FIG. 9 shows an exploded view of this embodiment showing the various layers. The strip 700 comprises a filling chamber 800, a first reaction chamber (or first chamber) 510, a transfer and reaction chamber (or second chamber) 310 and a second reaction chamber (or third chamber) 520. Perforations 410 in layer 400 serve to connect first reaction chamber (or first chamber) 510 with transfer and reaction chamber (or second chamber) 310. Layer 400 with perforation 410 is a barrier layer between first reaction chamber (or first chamber) 510 and transfer and reaction chamber (or second chamber) 310. Perforation 410 defines a fluid pathway in the barrier layer. Perforations 420 in layer 400 serve to connect transfer and reaction chamber (or second chamber) 310 with second reaction chamber (or third chamber) 520. Layer 400 with perforation 420 is a second barrier layer between transfer and reaction chamber (or second chamber) 310 and second reaction chamber (or third chamber) 520. Perforation 420 defines a second fluid pathway in the second barrier layer. In use, sample is added to filling chamber 800 until it fills to the opening to 510 at the end of filling chamber 800, whereupon the sample fills first reaction chamber (or first chamber) 510. The air that is necessarily displaced during this filling process will vent through the open ends of second reaction chamber (or third chamber) 520, via perforations 410 and 420. One or more reagents and reagent layers can be dried into first reaction chamber (or first chamber) 510 to do a sample pretreatment step, for example. The transfer and reaction chamber (or second chamber) 310 includes at least one surface, for example, the upper surface of layer 200, that is its inner surface and is not coplanar with the barrier layer (layer 400 with perforation 410). The transfer and reaction chamber (or second chamber) 310 includes at least one outer surface, for example, the lower surface of layer 200. After the desired time in first reaction chamber (or first chamber) 510, the transfer of fluid to transfer and reaction chamber (or second chamber) 310 can be initiated by the means disclosed, such as pushing on layer 200 from below until it contacts the lower surface of layer 300 at the perforated area 410. When this is initiated, treated sample will flow from first reaction chamber (or first chamber) 510 to fill transfer and reaction chamber (or second chamber) 310 until perforations 420 are blocked with liquid sample such that air can no longer vent through perforations 420. Optionally, a second set of reagents can be dried into transfer and reaction chamber (or second chamber) 310 if desired to perform a second reaction of the sample, such as a binding reaction as discussed below. Note that it is advantageous, but not necessary, for reactions to take place in all chambers. For example, first reaction chamber (or first chamber) 510 could correspond to the reaction chamber of the embodiment shown in FIGS. 1-7 and second reaction chamber (or third chamber) 520 could function as the detection chamber. In this case, transfer and reaction chamber (or second chamber) 310 acts purely as a transfer chamber which separates first reaction chamber (or first chamber) 510 and second reaction chamber (or third chamber) 520 laterally as well as by perforated area 420. This can be advantageous in some applications in minimizing vapor from the fluid in first reaction chamber (or first chamber) 510, when filled, from diffusing to second reaction chamber (or third chamber) 520 and wetting the reagents prematurely.

After the sample fluid is present in transfer and reaction chamber (or second chamber) 310 for the desired time, a further transfer of sample from transfer and reaction chamber (or second chamber) 310 to second reaction chamber (or third chamber) 520 can occur via perforations 420. The second reaction chamber (or third chamber) 520 includes at least one surface, for example, the lower surface of layer 600, that is its inner surface and is not coplanar with the second barrier layer (layer 400 with perforation 420). The second reaction chamber (or third chamber) 520 includes at least one outer surface, for example, the upper surface of layer 600. This transfer can be initiated, for example, by pushing on the upper surface of layer 600 above perforations 420 such that the lower surface of layer 600 comes into contact with at least some of perforations 420. Further reagents can be dried into second reaction chamber (or third chamber) 520 to further treat or react with components of the sample. For example, the results of any reactions carried out in transfer and reaction chamber (or second chamber) 310 and first reaction chamber (or first chamber) 510 can be detected in second reaction chamber (or third chamber) 520 and converted into a usable signal, either optical, electrochemical or for some other suitable method.

FIG. 9 gives more detail of how the various chambers in this embodiment are formed. Layers 200 and 600 are the lower and upper closing layers, respectively, whose functions are to close faces of the capillary spaces in the strip, provide layers to contact the perforated layer to initiate fluid transfer if initiation is performed in this manner, and to serve as supports on to which one or more other layers may be placed. Examples of other layers are layers of conductive material to form electrodes and electrical connection tracks and dried reagent layers that may be required to process the sample in the various chambers.

Layer 500 is an upper spacer layer. Portions of layer 500 are either cut away or otherwise formed to define the area of first and second reaction chambers (or first and third chambers) 510, 520. Layer 500 can be formed from a substrate with adhesive coated on both sides or may be just a layer of adhesive that has been formed or laid down with the areas that will correspond to first and second reaction chambers (or first and third chambers) 510, 520 left free of adhesive. If an adhesive coated substrate is used, the areas corresponding to first and second reaction chambers (or first and third chambers) 510, 520 could be formed by punching or otherwise removing those areas.

Layer 400 is a layer that acts as a barrier between, and comprises the perforations necessary to complete the fluid transfers between, first reaction chamber (or first chamber) 510 and transfer and reaction chamber (or second chamber) 310 and transfer and reaction chamber (or second chamber) 310 and second reaction chamber (or third chamber) 520 when required. The perforations can be formed as described elsewhere in this disclosure. Layer 300 is a second spacer layer with an open area that serves to define transfer and reaction chamber (or second chamber) 310. This can be constructed by the methods given above for layer 500. Filling chamber 800 can be formed by first laminating or otherwise joining layers 300, 400 and 500 with areas 310, 510 and 520 and perforations 410 and 420 pre-formed in the respective layers, and then punching through the tri-laminate to form the cut-out for filling chamber 800. Alternatively, the regions of 300, 400 and 500 that correspond to filling chamber 800 can be formed separately in the layers and then the layers laminated such that the cut-out regions align to form the side walls of filling chamber 800. The end faces of filling chamber 800 are closed when 200 and 600 are laminated to the upper and lower surfaces of the tri-laminate comprising 300, 400 and 500.

Referring to the embodiment illustrated in FIGS. 1-6, to function as a dry strip immunoassay, reagents can be dried into reaction chamber (or first chamber) 2 and detection chamber (or second chamber) 3 during fabrication. The reagents in reaction chamber (or first chamber) 2 comprise a probe linked to a binding agent (hereafter termed the conjugate) and a binding target to which the binding agent can bind, where the species carrying the binding target, or the binding target itself, can be prevented from entering detection chamber (or second chamber) 3. For example, the conjugate can consist of an enzyme such as PQQ dependent glucose dehydrogenase (GDHpqq) linked to an antibody to an analyte of interest. The target binding site can then be the analyte of interest tethered to magnetic beads. The magnetic beads can be prevented from entering the detection chamber by means of a magnet confining them to reaction chamber (or first chamber) 2. Alternatively, the beads need not be magnetic but be large enough such that they cannot fit through the pores 150 in layer 40, such that this prevents them from entering detection chamber (or second chamber) 3. When there is analyte in the sample, the free analyte can bind to the binding site on the conjugate and therefore block the conjugate from binding to the immobilized target sites. The conjugate therefore remains free in solution and so able to transfer to detection chamber (or second chamber) 3. In this embodiment it is desirable that the conjugate and the target binding site are not mixed before the sample contacts the reagents. To achieve this, the conjugate can be dried onto the lower face of 60 and the species carrying the target binding sites onto the upper face of 40. If the target binding sites are located on magnetic beads a permanent or electromagnet placed next to the upper face of 60 can draw the beads up to mix with the conjugate after sample has filled reaction chamber (or first chamber) 2 and freed the magnetic beads from the initially dry layer. In addition, the magnet serves to prevent the beads entering detection chamber (or second chamber) 3.

Detection chamber (or second chamber) 3 also contains reagents dried down during strip fabrication. These reagents are those necessary to translate the presence of the probe into a current that can flow between the electrodes in detection chamber (or second chamber) 3. In this embodiment of the invention where the probe is an enzyme, a substrate and electrochemically active mediator for the enzyme can be incorporated. Alternatively, the substrate for the enzyme can be incorporated into reaction chamber (or first chamber) 2. This has advantages where the substrate can take some time to become active. When the probe is GDH, glucose is a suitable substrate, however the GDHpqq is only active with β-D-glucose. D-glucose in the dried state is predominately in the form of a-D-glucose, which proceeds to mutarotate to β-D-glucose once it dissolves. Thus it is advantageous to dissolve the glucose in the sample in reaction chamber (or first chamber) 2 so that it can mutarotate while the binding reactions are taking place.

Any fluid containing a probe that enters the detection chamber will dissolve the dried chemicals and the chemicals and the probe begin to react. In the case of GDHpqq as the probe, glucose is a suitable substrate and ferricyanide is a suitable mediator. When GDHpqq, glucose and ferricyanide are mixed the GDHpqq will oxidize the glucose and be reduced in the process, the GDHpqq will then be reoxidised by ferricyanide, which forms ferrocyanide in the process. The ferrocyanide can then be oxidized at the anode in the detection chamber to produce a measurable current. This current can be related to the rate of production of ferrocyanide, which in turn can be related to the concentration of GDHpqq in the detection chamber, which in turn can be related to the concentration of analyte originally in the sample.

Optimally, the chemistry dried into the detection chamber should be dried onto the upper surface 180 of 20. This prevents liquid filling the pores 150 of 40 coming into contact with the dried reagents prematurely. Additionally, the dissolving of the chemistry on 20 in the reacted sample liquid when the chemistry contacts the liquid filled pores 150 of 40 (as set out below) helps to encourage the transfer of liquid into the detection chamber.

In order for the GDHpqq to be detected in the detection chamber liquid from the reaction chamber must be transferred to the detection chamber after a pre-determined time when the binding reactions in the reaction chamber have proceeded to the desired point. When the liquid fills the reaction chamber, the hydrophilicity of the pores 150 in 40 are such that they also fill with liquid at this point. However, for the liquid to exit the pores 150 at the face 160 of 40 facing the detection chamber it would have to increase the area of the air/liquid interface, which the liquid surface tension opposes. Therefore the liquid tends to fill to the base of the pores 150 and stop. In this embodiment, in order to break the surface tension layer 20 is pushed from below in the region of the detection chamber. This distorts 20 such that its upper surface 180 comes into contact with the lower surface 160 of 40. At the point(s) of contact, the liquid can now exit the pores 150 in 40 without increasing the air/liquid interface area by directly wetting the upper face 180 of 20. However, as the pushing mechanism is withdrawn and the upper face 180 of 20 moves away from the lower face 160 of 40, the solution that wetted 20 moves away with it and draws more liquid through the pores 150 of 40 in order to minimize the ratio of air/liquid interface to liquid volume as the surfaces move apart. This process draws liquid through the pores 150 until eventually the detection chamber is completely filled. Note that both the reaction chamber and the detection chamber should be open to the atmosphere when they are being filled for correct function, so that air can be displaced and vented during the filling processes. In the embodiment shown in FIGS. 1-3, a venting function is provided by the reaction and detection chambers opening to the sides of the strip 100. In the embodiment shown in FIGS. 4-6, the detection chamber is vented through its openings to the sides of the strip and the reaction chamber is vented through the open sides of the detection chamber via the pores 150 in 40.

Also, in order for this embodiment to function optimally it is desirable that the filling of the detection chamber does not result in the emptying of a chamber with similar capillary dimensions, as the two forces can oppose one another and create a slow or incomplete fill. In the strip 100 shown, the filling chamber has a larger capillary dimension than either the reaction or the detection chamber. Thus when the detection chamber fills, the filling chamber will empty if there is no excess liquid attached to the filling chamber. Since the filling chamber has a larger capillary dimension than the detection chamber, the filling of the detection chamber will be less impeded. Alternatively, if the filling chamber has the same capillary dimensions as the detection chamber then the detection chamber should be more hydrophilic than the filling chamber in order to affect the transfer of liquid. In general, the value of $(\gamma_{d,SL} - \gamma_{d,SA}) \Delta A_d + (\gamma_{FSA} - \gamma_{f,SL}) \Delta A_f$ should be considered, where $\gamma$ is the surface tension, $\Delta A$ is the change in the wetted area of a chamber, the subscripts d and f refer to the detection and filling chambers, respectively, SL refers to the solid-liquid interface and SA refers to the solid-air interface.

The invention has a number of advantages over the related art. A pusher mechanism rather than a piercing mechanism can be used to initiate fluid transfer, which should add robustness to the system. Also, the chambers can be stacked one upon the other, leading to miniaturization and manufacturing advantages. Also, multiple chambers can be stacked and offset, with multiple pusher mechanisms, as exemplified in FIGS. 8 and 9, thus allowing multiple chambers in either parallel or series to be filled as desired times, increasing flexibility. Also, electrode areas in the detection cell can be more conveniently defined since a cut-out region in 30 can entirely define the electrode areas.

Examples 1 and 2, below, are given as examples of embodiments of the invention and should not be considered as limiting in any way.

EXAMPLE 1

0.007 inch thick Melinex 329 was sputter coated with a thin layer of palladium to give an electrical resistance of 10 Ohms/sq to form layer 20. 0.002 inch thick Melinex 329 was coated with ca. 22 microns of heat activated adhesive ARCare-90503 (Adhesives Research Inc) on both sides to serve as layers 30 and 50. The adhesive tape was supplied with siliconised PET release liners on both faces.

A 0.004 inch thick web of PET was perforated by laser cutting through holes in lines in the down-web direction. The holes were conical in shape with the larger end being 150 micron diameter and the smaller end being 45 microns in diameter. The average hole density was 8.2 holes/mm$^2$. After perforation, one side of the web was sputter coated with gold to give an electrical resistance of 10 Ohms/sq.

The double sided adhesive tape was laminated to both sides of the perforated PET leaving the gaps as shown in FIG. 1 which would form the reaction chamber 2 and the detection chamber 3. The palladium coated Melinex was then laminated to the lower face of layer 30 to form layer 20. Clear PET film was laminated to the upper face of layer 50 to form layer 60. Filling chamber 1 was then formed by punching through layers 20 to 60 and laminating adhesive coated PET film layers 10 and 70 to close the faces of filling chamber 1.

Conjugate and derivatised magnetic beads were prepared as per US Patent Application Publication No. US-2006-0134713-A1, herein incorporated by reference. The conjugate comprised an antibody to CRP (C-Reactive Protein) joined to at least one GDHpqq. The surface of the magnetic beads were modified to comprise CRP. This CRP served as the immobilized binding site for the conjugate. The magnetic beads were prevented from entering the detection chamber by a permanent magnet placed near the reaction chamber.

The conjugate was dried onto the lower face of layer 60. In some strips beads were dried on the upper face of layer 40. A mixture of potassium ferricyanide, glucose and buffer was dried on the upper surface of layer 20. During testing a permanent magnet was placed adjacent to the upper face of layer 60. This served the dual purpose of preventing beads (if present) entering the detection chamber and attracting the beads towards the layer of conjugate to promote mixing of the two once the sample was introduced into the reaction chamber.

In use, sample was introduced into filling chamber 1 until it filled across to touch the entrance to reaction chamber 2, whereupon reaction chamber 2 also filled with sample. Sixty seconds was then allowed to elapse. After sixty seconds, a metal rod was pressed against the lower surface of 20 such that 20 was deflected up until the upper surface of 20 came into contact with liquid filling the holes in layer 40, whereupon liquid flowed through the holes in 40 to completely fill detection chamber 3. When liquid bridged the space between the electrode on the upper face of 20 and that on the lower face of 40 the meter initiated an electrochemical test sequence, where it made the lower electrode +300 mV relative to the upper electrode for 16 seconds.

Figure 10:
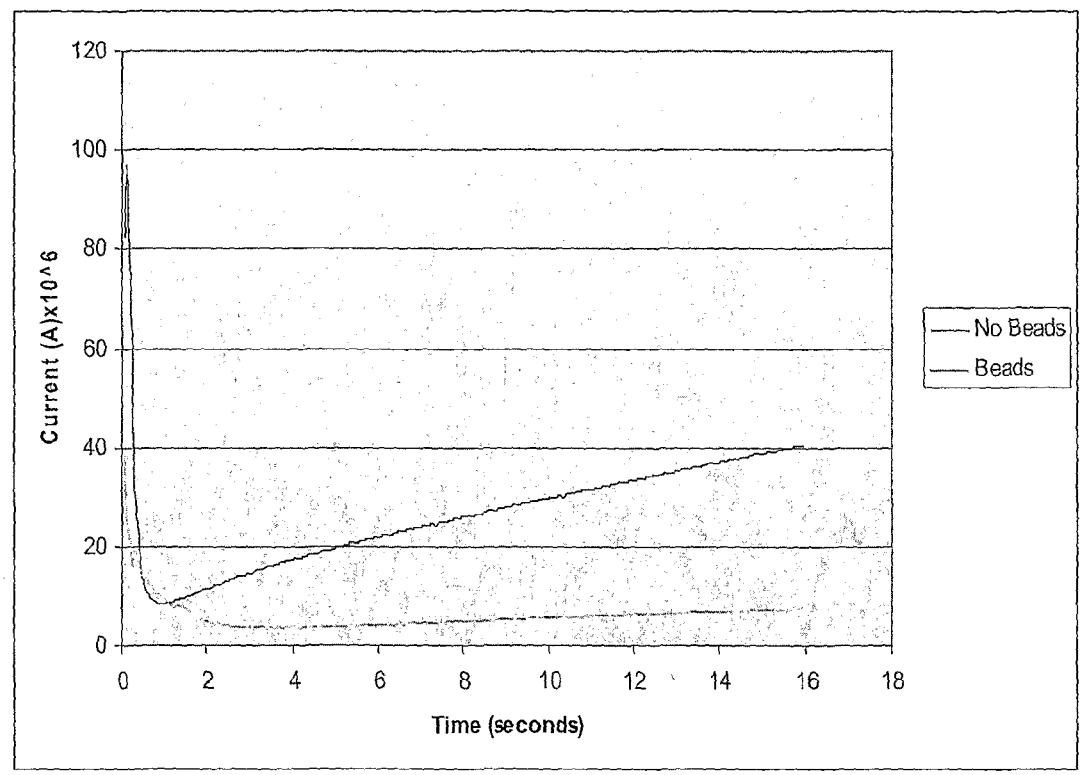
FIG. 10 is a graph showing current as a function of time of a first example of the invention.

FIG. 10 shows plots of the typical current response for strips filled with 0.1 M HEPES buffer in water with and without the presence of CRP labeled beads in the test solution. When no beads are present, maximal conjugate should be transferred to detection chamber 3. When an excess of CRP labeled beads over conjugate is present in the solution the conjugate is substantially immobilised on the beads leading to a minimal transfer of conjugate to detection chamber 3. In this case the lower electrode was at +300 mV with respect to the upper electrode during the sixteen seconds the potential was applied.

Figure 11:
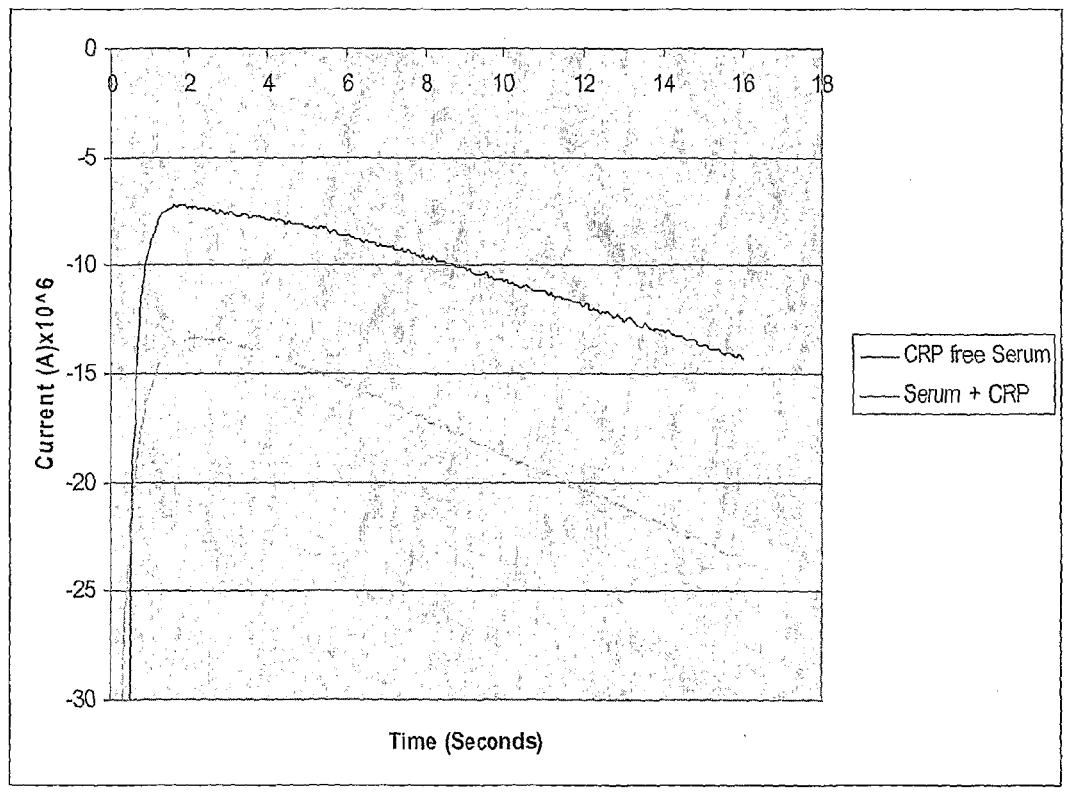
FIG. 11 is a graph showing current as a function of time of a second example of the invention.

FIG. 11 shows typical current responses for strips with conjugate and beads dried into them when tested blood serum containing either zero or 250 micrograms/milliliter of CRP. In this case the upper electrode was at +300 mV with respect to the lower electrode.

EXAMPLE 2

The invention is also pertinent to a sensor with a single, larger punched hole in layer 40 rather than a series of small, laser formed holes. For example, a 1.5 mm diameter male/female punch was used to create a hole in layer 40. When liquid filled chamber 2, it stopped just past the edge of the hole. When layer 20 was pushed against the hole, the liquid entered chamber 3.

The invention is not restricted to the number of holes per sensor or the range of hole diameters described in Examples 1 and 2.

The invention is not limited to the above-described exemplary embodiments. It will be apparent, based on this disclosure, to one of ordinary skill in the art that many changes and modifications can be made to the invention without departing from the spirit and scope thereof.

What is claimed is:

1. A fluid transfer device for transferring a fluid from a first chamber to a second chamber, the device comprising:
    a first chamber;
    a second chamber; and
    a barrier layer between the first chamber and the second chamber, the barrier layer having at least one opening fluidly connecting the first chamber to the second chamber, the at least one opening defining a fluid pathway from the first chamber to the second chamber, the at least one opening being sized such that a retention force keeps the fluid in the first chamber and the at least one opening,
    wherein at least a portion of the second chamber is movable with respect to the barrier layer, and
    wherein the fluid can be transferred from the first chamber to the second chamber via the fluid pathway when an initiation input is introduced to the device such that the portion of the second chamber contacts the fluid at the at least one opening.

2. The device of claim 1, wherein the retention force comprises surface tension of the fluid at the at least one opening.

3. The device of claim 2, wherein the second chamber has an inner surface and an outer surface, wherein at least a portion of the inner surface of the second chamber is movable with respect to the barrier layer, and
    the initiation input comprises pressure applied to the outer surface of the second chamber such that the portion of the inner surface of the second chamber contacts the fluid at the at least one opening and causes the fluid to flow via the fluid pathway into the second chamber.

4. The device of claim 1, wherein the device is a sensor strip,
    the first chamber is a reaction chamber of the sensor strip, and
    the second chamber is a detection chamber of the sensor strip.

5. The device of claim 1, further comprising
    a third chamber; and
    a second barrier layer between the second chamber and the third chamber, the second barrier layer having at least one opening fluidly connecting the second chamber to the third chamber, the at least one opening defining a second fluid pathway from the second chamber to the third chamber, the at least one opening in the second barrier layer being sized such that a second retention force keeps the fluid in the second chamber and the at least one opening in the second barrier layer,
    wherein at least a portion of the third chamber is movable with respect to the second barrier layer, and
    wherein the fluid can be transferred between the second chamber and the third chamber via the second fluid pathway when a second initiation input is introduced such that the portion of the third chamber contacts the fluid at the at least one opening in the second barrier layer.

6. The device of claim 5, wherein the second retention force comprises surface tension of the fluid at the at least one opening in the second barrier layer.

7. The device of claim 6, wherein the third chamber has an inner surface and an outer surface, wherein at least a portion of the inner surface of the third chamber is movable with respect to the second barrier layer, and
    the second initiation input comprises pressure applied to the outer surface of the third chamber such that the portion of the inner surface of the third chamber contacts the fluid in the at least one opening in the second barrier layer and causes the fluid to flow via the second fluid pathway in the second barrier layer into the third chamber.

8. The device of claim 5, wherein the device is a sensor strip,
    the first chamber is a reaction chamber of the sensor strip,
    the second chamber is a transfer and reaction chamber of the sensor strip, and
    the third chamber is a detection chamber of the sensor strip.

9. A method of transferring a fluid from a first chamber to a second chamber using the fluid transfer device of claim 1, comprising:
    providing a first chamber;
    providing a second chamber;
    providing a barrier layer between the first chamber and the second chamber, the barrier layer having at least one opening fluidly connecting the first chamber to the second chamber, the at least one opening defining a fluid pathway from the first chamber to the second chamber, the at least one opening being sized such that a retention force keeps the fluid in the first chamber and the at least one opening in the barrier layer;
    introducing the fluid to the first chamber to at least partially wet the barrier layer at the at least one opening;
    transferring the fluid from the first chamber to the second chamber via the fluid pathway,
    wherein the transferring takes place when an initiation input is introduced such that a portion of the second chamber contacts the fluid at the at least one opening in the barrier layer, and
    wherein the portion of the second chamber is movable with respect to the barrier layer.

10. The method of claim 9, wherein the retention force comprises surface tension of the fluid at the at least one opening.

11. The method of claim 10, wherein the initiation input comprises fluid pressure applied to the fluid in the at least one opening and in a direction from the first chamber to the second chamber.

12. The method of claim 10, wherein the initiation input comprises pressure applied to an outer surface of the second chamber such that an inner surface of the second chamber contacts the fluid in the at least one opening and causes the fluid to flow via the fluid pathway into the second chamber, wherein the inner surface of the second chamber is not coplanar with the barrier layer.

13. The method of claim 9, wherein the first chamber is a reaction chamber of a sensor strip, and
the second chamber is a detection chamber of the sensor strip.

14. The method of claim 9, further comprising
providing a third chamber;
providing a second barrier layer between the second chamber and the third chamber, the second barrier layer having at least one opening fluidly connecting the second chamber to the third chamber, the at least one opening defining a second fluid pathway from the second chamber to the third chamber, the at least one opening in the second barrier layer being sized such that a second retention force keeps the fluid in the second chamber and the at least one opening in the second barrier layer; and
transferring the fluid from the second chamber to the third chamber via the second fluid pathway,
wherein the transferring between the second chamber and the third chamber takes place when a second initiation input is introduced such that a portion of the third chamber contacts the fluid at the at least one opening in the second barrier layer, and
wherein the portion of the third chamber is movable with respect to the second barrier layer.

15. The method of claim 14, wherein the second retention force comprises surface tension of the fluid at the at least one opening in the second barrier layer.

16. The method of claim 15, wherein the second initiation input comprises fluid pressure applied to the fluid in the at least one opening in the second barrier layer and in a direction from the second chamber to the third chamber.

17. The method of claim 15, wherein the second initiation input comprises pressure applied to an outer surface of the third chamber such that an inner surface of the third chamber contacts the fluid in the at least one opening in the second barrier layer and causes the fluid to flow via the second fluid pathway in the second barrier layer into the third chamber, wherein the inner surface of the third chamber is not coplanar with the second barrier layer.

18. The method of claim 14, wherein the first chamber is a reaction chamber of a sensor strip,
the second chamber is a transfer and reaction chamber of the sensor strip; and
the third chamber is a detection chamber of the sensor strip.

19. The device of claim 1, wherein the barrier layer comprises an electrode.

20. The device of claim 1, wherein the movable portion of the second chamber comprises an electrode.

21. The device of claim 1, wherein the first chamber and the second chamber are stacked.

22. The device of claim 21, wherein the first chamber and the second chamber are offset.

23. The device of claim 21, wherein the first chamber and the second chamber are at least partially overlapping.

24. The device of claim 1, wherein the device is an disposable immunoassay strip.

25. The device of claim 1 further comprising a filling chamber, wherein the fluid can be transferred from the filling chamber to the first chamber via capillary action.

26. The device of claim 25, wherein the filling chamber has a larger volume than the first chamber.

27. The device of claim 24, wherein the strip is formed from a plurality of layers, and the first and second chambers being formed in separate layers.

28. The method of claim 9, wherein the transferring the fluid from the first chamber to the second chamber via the fluid pathway comprises
deflecting the movable portion of the second chamber to contact the fluid at the at least one opening, thereby drawing the fluid into the second chamber.

29. The method of claim 9 comprising:
providing a first and second electrode layer either side of the second chamber; and
electrically connecting the first and second electrode layers to a meter.

30. The method of claim 29 further comprising
measuring an electrical property of the second chamber using the first and second electrode layer to determine a fill state of the second chamber.

* * * * *